United States Patent
Kim et al.

(10) Patent No.: US 10,873,605 B2
(45) Date of Patent: Dec. 22, 2020

(54) SYSTEM AND METHOD FOR TRACKING INFORMATION LEAKAGE AT ENDPOINT

(71) Applicant: SOMANSA CO., LTD., Seoul (KR)

(72) Inventors: Sang Wook Kim, Seoul (KR); Tae Wan Kim, Seoul (KR); Il Hoon Choi, Seoul (KR)

(73) Assignee: SOMANSA CO., LTD., Seoul (KR)

( * ) Notice: Subject to any disclaimer, the term of this patent is extended or adjusted under 35 U.S.C. 154(b) by 287 days.

(21) Appl. No.: 16/202,618

(22) Filed: Nov. 28, 2018

(65) Prior Publication Data

US 2020/0145461 A1   May 7, 2020

(30) Foreign Application Priority Data

Nov. 5, 2018 (KR) .......................... 10-2018-0134701

(51) Int. Cl.
| | |
|---|---|
| *H04L 29/06* | (2006.01) |
| *G06F 16/23* | (2019.01) |
| *G06F 21/62* | (2013.01) |
| *G06F 21/55* | (2013.01) |

(52) U.S. Cl.
CPC .......... *H04L 63/20* (2013.01); *G06F 16/2379* (2019.01); *G06F 21/6245* (2013.01)

(58) Field of Classification Search
None
See application file for complete search history.

(56) References Cited

U.S. PATENT DOCUMENTS

| | | | | |
|---|---|---|---|---|
| 2009/0163174 A1* | 6/2009 | Baik | ................. | H04W 12/1202 455/410 |
| 2010/0169980 A1* | 7/2010 | Kim | .................... | G06F 21/6245 726/27 |
| 2019/0230120 A1* | 7/2019 | Chen | .................... | H04L 9/0819 |

FOREIGN PATENT DOCUMENTS

| | | |
|---|---|---|
| KR | 10-2009-0059694 A | 6/2009 |
| KR | 10-2014-0027603 A | 3/2014 |
| KR | 10-2018-0052466 A | 5/2018 |

* cited by examiner

*Primary Examiner* — Joseph P Hirl
*Assistant Examiner* — Hassan Saadoun
(74) *Attorney, Agent, or Firm* — Harness, Dickey & Pierce, P.L.C.

(57) ABSTRACT

Disclosed is a system for tracking an information leakage of an endpoint. The system includes a management server which transmits the detection pattern information to an endpoint terminal connected through a network and an endpoint terminal which monitors generation and change of a file by using the detection pattern information, performs a first detection activity through matching information stored in a heap memory of a currently-executed process with the detection pattern information, and a second detection activity according to monitoring of a particular application program interface (API) according to process execution, executes an information leakage response process corresponding to first detection activity information and second detection activity information, and transmits the first detection activity information and the second detection activity information to the management server.

14 Claims, 7 Drawing Sheets

SYSTEM AND METHOD FOR TRACKING INFORMATION LEAKAGE AT ENDPOINT

CROSS-REFERENCE TO RELATED APPLICATION

This application claims priority to and the benefit of Korean Patent Application No. 2018-0134701, filed on Nov. 5, 2018, the disclosure of which is incorporated herein by reference in its entirety.

FIELD

The present invention relates to a technology of detecting an information leakage, and more particularly, to a system and a method which are operated in an endpoint environment for tracking an information leakage at an endpoint which detects an information leakage action.

BACKGROUND

An information leakage prevention system which has been currently introduced in a large number of organizations detects an information leakage action by inspecting whether a regular personal information expression pattern, a keyword pattern, or the like defined by an information leakage prevention policy in advance is matched with data stored in or transmitted to a desktop personal computer (PC), a server, a network, and a database. In the information leakage prevention system, it is possible only to identify an endpoint where a leakage occurs and to perform a response defined in the policy. Also, it is impossible to track a file which is a target to be leaked is generated by whom, when, how, and the like and it is impossible to detect an encoded file.

Recently, accidents of distributing a malignant code in an endpoint environment of a person in charge with respect to processing personal information and consistently transmitting the malignant code through a C&C server continuously occur. In this situation, there is a limit in properly responding by only the information leakage prevention system.

SUMMARY

The present invention is directed to providing a system and a method for tracking an information leakage at an endpoint which detect an information leakage performed at an endpoint terminal or provide tracking information with respect to the detected leakage information.

According to an aspect of the present invention, there is provided a system for tracking an information leakage of an endpoint. The system includes a management server including a detection pattern generator which generates detection pattern information for detecting a leakage of user personal information and keyword information with respect to a target to be managed, a database which stores the detection pattern information, a server communication portion which transmits the detection pattern information to the endpoint terminal connected through a network, and a server controller which controls them and an endpoint terminal including a storage which stores the detection pattern information provided from the management server, a first detection activity performer which monitors generation and change of a file by using the detection pattern information, searches for whether data to be detected is stored, and performs a first detection activity through matching information stored in a heap memory of a currently-executed process with the detection pattern information, a second detection activity performer which performs a second detection activity according to monitoring of a particular application program interface (API) according to process execution, a leakage response executer which executes an information leakage response process corresponding to first detection activity information obtained by performing the first detection activity and second detection activity information according to the second detection activity, a terminal communication portion which transmits the first detection activity information and the second detection activity information to the management server, and a terminal controller which controls them. Here, the database of the management server stores leakage information corresponding to the first detection activity information and the second detection activity information transmitted from the endpoint terminal.

The detection pattern information may include at least one of a resident registration number, a passport number, a driver's license number, a credit card number, and an account number of a user.

The first detection activity performer may perform the first detection activity through matching the detection pattern information with at least one of user identification (ID) information, a user Internet protocol (IP), use time, and used-process information stored in the heap memory.

The second detection activity performer may monitor execution of the particular API and may perform the second detection activity through matching the detection pattern information with API execution argument information when the particular API is executed.

The management server may further include a leakage information extractor which receives a search request signal with respect to leakage information from a user terminal and extracts leakage information corresponding to the search request signal. Here, the server communication portion may transmit the extracted leakage information to the user terminal.

The leakage information extractor may extract the leakage information corresponding to the search request signal by using file information of the leakage information, process information with respect to the leakage information, and action information handled by a process of processing the leakage information stored in the database.

The action information may include process operation type information including storage, encoding, compression, and transmission through a network and destination information according to operation performance.

According to another aspect of the present invention, there is provided a method of tracking an information leakage of an endpoint. The method includes generating detection pattern information, by a management server, for detecting a leakage of user personal information and keyword information of a managed endpoint terminal, transmitting the detection pattern information, by the management server, to the endpoint terminal connected through a network, performing a first detection activity, by the endpoint terminal, by storing the detection pattern information provided by the management server, monitoring generation and change of a file by using the detection pattern information, searching for whether data to be detected, and matching information stored in a heap memory of a currently-executed process with the detection pattern information, performing a second detection activity, by the endpoint terminal, according to monitoring of a particular API according to process execution, executing an information leakage response process, by the endpoint terminal, corresponding to first detection activity information according to the first detection activity and second detection activity information according to the second detection activity, transmitting, by the endpoint terminal, the first detection activity information and the second detection activity information to the management server, and storing, by the management server, leakage information corresponding to the first detection activity information and the second detection activity information transmitted from the endpoint terminal.

The detection pattern information may include at least one of a resident registration number, a passport number, a driver's license number, a credit card number, and an account number of a user.

The performing of the first detection activity may include performing the first detection activity through matching the detection pattern information with at least one of user ID information, a user IP, use time, and used-process information stored in the heap memory.

The performing of the second detection activity may include monitoring execution of the particular API and performing the second detection activity through matching the detection pattern information with API execution argument information when the particular API is executed.

The method may further include receiving a search request signal with respect to leakage information from a user terminal, extracting leakage information corresponding to the search request signal, and transmitting the extracted leakage information to the user terminal.

The extracting of the leakage information may include extracting the leakage information corresponding to the search request signal by using file information of the leakage information, process information with respect to the leakage information, and action information handled by a process of processing the leakage information stored in the management server.

The action information may include process operation type information including storage, encoding, compression, and transmission through a network and destination information according to operation performance.

BRIEF DESCRIPTION OF THE DRAWINGS

The above and other objects, features and advantages of the present invention will become more apparent to those of ordinary skill in the art by describing exemplary embodiments thereof in detail with reference to the accompanying drawings, in which.

DETAILED DESCRIPTION

Hereinafter, exemplary embodiments of the present invention will be described in detail with reference to the attached drawings.

The embodiments of the present invention are provided to more completely explain the present invention to one of ordinary skill in the art. The following embodiments may be modified into a variety of different forms, and the scope of the present invention is not limited thereto. The embodiments are provided to make the disclosure more substantial and complete and to completely convey the concept of the present invention to those skilled in the art.

The terms used herein are to explain particular embodiments and are not intended to limit the present invention. As used herein, singular forms, unless contextually defined otherwise, may include plural forms. Also, as used herein, the term "and/or" includes any and all combinations or one of a plurality of associated listed items.

Hereinafter, embodiments of the present invention will be described with reference to the drawings which schematically illustrate the embodiments.

Figure 1:
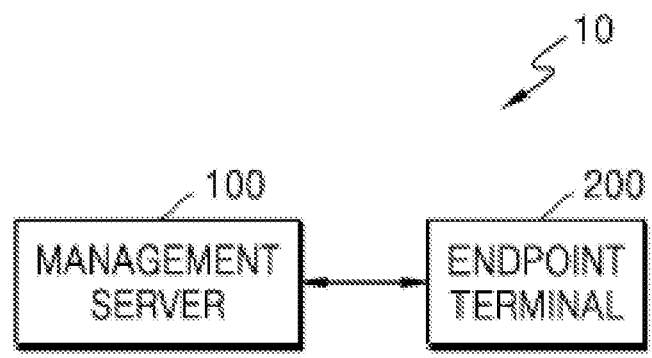
FIG. 1 is a block diagram illustrating a system for tracking an information leakage at an endpoint according to one embodiment of the present invention.

FIG. 1 is a block diagram illustrating a system 10 for tracking an information leakage at an endpoint according to one embodiment of the present invention.

Referring to FIG. 1, the system 10 includes a management server 100 and an endpoint terminal 200.

The management server 100 generates detection pattern information for detecting a leakage of user personal information and keyword information with respect to a target to be managed and transmits the generated detection pattern information to the endpoint terminal 200 connected through a network.

The endpoint terminal 200 performs a first detection activity through matching of keyword pattern stored in a heap memory of a currently executed process by using detection pattern information provided by the management server 100, performs a second detection activity by monitoring of a particular application program interface according to performing the process, executes an information leakage-response process according to detection information obtained by the first detection activity and the second detection activity, and transmits the detected information to the management server 100.

Figure 2:
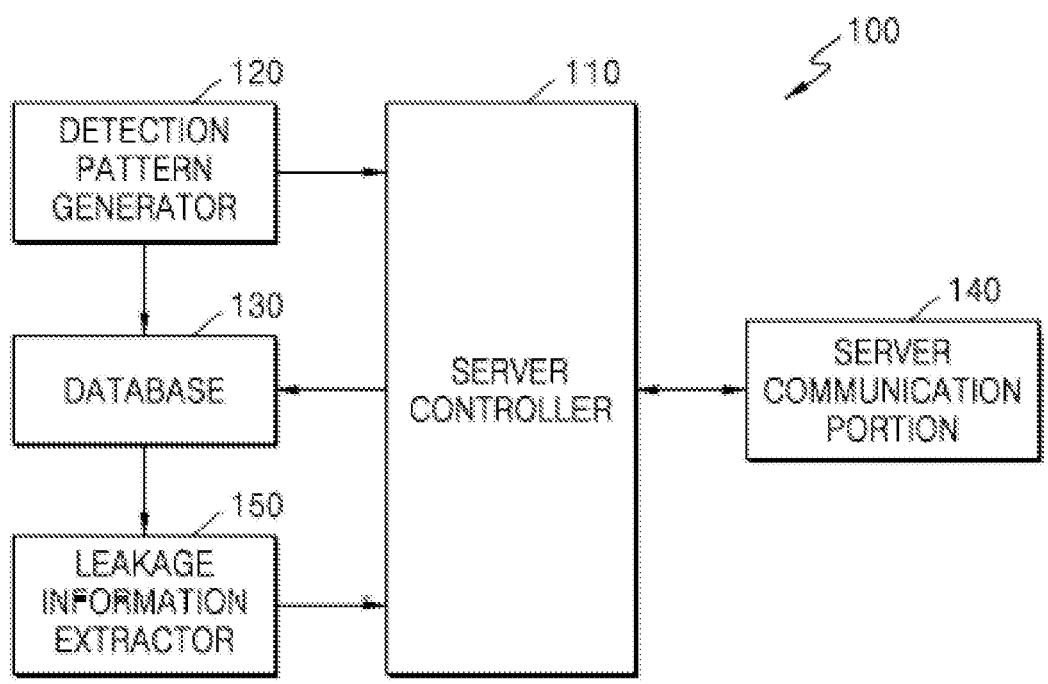
FIG. 2 is a block diagram illustrating a management server according to one embodiment of the present invention.

FIG. 2 is a block diagram illustrating the management server 100 according to one embodiment of the present invention.

Referring to FIG. 2, the management server 100 includes a server controller 110, a detection pattern generator 120, a database 130, a server communication portion 140, and a leakage information extractor 150.

The server controller 110 controls operations of the detection pattern generator 120, the database 130, the server communication portion 140, and the leakage information extractor 150 which are included in the management server 100. To this end, the server controller 110 may include one or more of a central processing unit (CPU), an application processor (AP), and a communication processor (CP). Accordingly, the server controller 110 may execute calculation or data processing related to control and/or communication of at least one component of the management server 100.

The detection pattern generator 120 generates detection pattern information for detecting a leakage of user personal information and keyword information with respect to a target to be managed. The detection pattern generator 120 may generate detection pattern information by using a resident registration number, a driver's license number a passport number, a credit card number, or an account number of a user. The detection pattern generator 120 transmits the generated detection pattern information to the database 130 under the control of the server controller 110.

The database 130 stores program information for a system operation of the management server 100. Also, the database 130 stores program information for detecting an information leakage generated at an endpoint. For example, the database 130 stores detection pattern information transmitted from the detection pattern generator 120. Also, the database 130 stores leakage information corresponding to first detection activity information and second detection activity information detected from the endpoint terminal 200.

The server communication portion 140 transmits the detection pattern information generated by the detection pattern generator 120 to the endpoint terminal 200 connected through a network under the control of the server controller 110. The server communication portion is connected to the endpoint terminal 200 through a wired communication network or wireless communication network. The wired communication network may include wired Internet and local area network (LAN). The wireless communication network may include a short-distance wireless communication network such as Bluetooth, wireless Internet such as wireless fidelity (WiFi), portable Internet such as wireless broadband Internet (WiBro) and worldwide interoperability for microwave access (WiMAX), 3.5 G mobile communication network such as high speed downlink packet access (HSDPA) and high speed uplink packet access (HSUPA), 4G mobile communication network such as long-term evolution (LTE) network and LTE-Advanced network, 5G mobile communication network, and the like. In order to transmit detection pattern information through the wired communication network or wireless communication network, the server communication portion 140 may include a wired communication module supporting wired communication protocols or a wireless communication module supporting wireless communication protocols.

The leakage information extractor 150 receives a detection request signal with respect to leakage information from a user terminal (not shown) and extracts leakage information corresponding to the detection request signal. When the leakage information is extracted, the server communication portion 140 transmits the leakage information to the user terminal under the control of the server controller 110. A detailed description on the leakage information extractor 150 will be described below for convenience of description.

Figure 3:
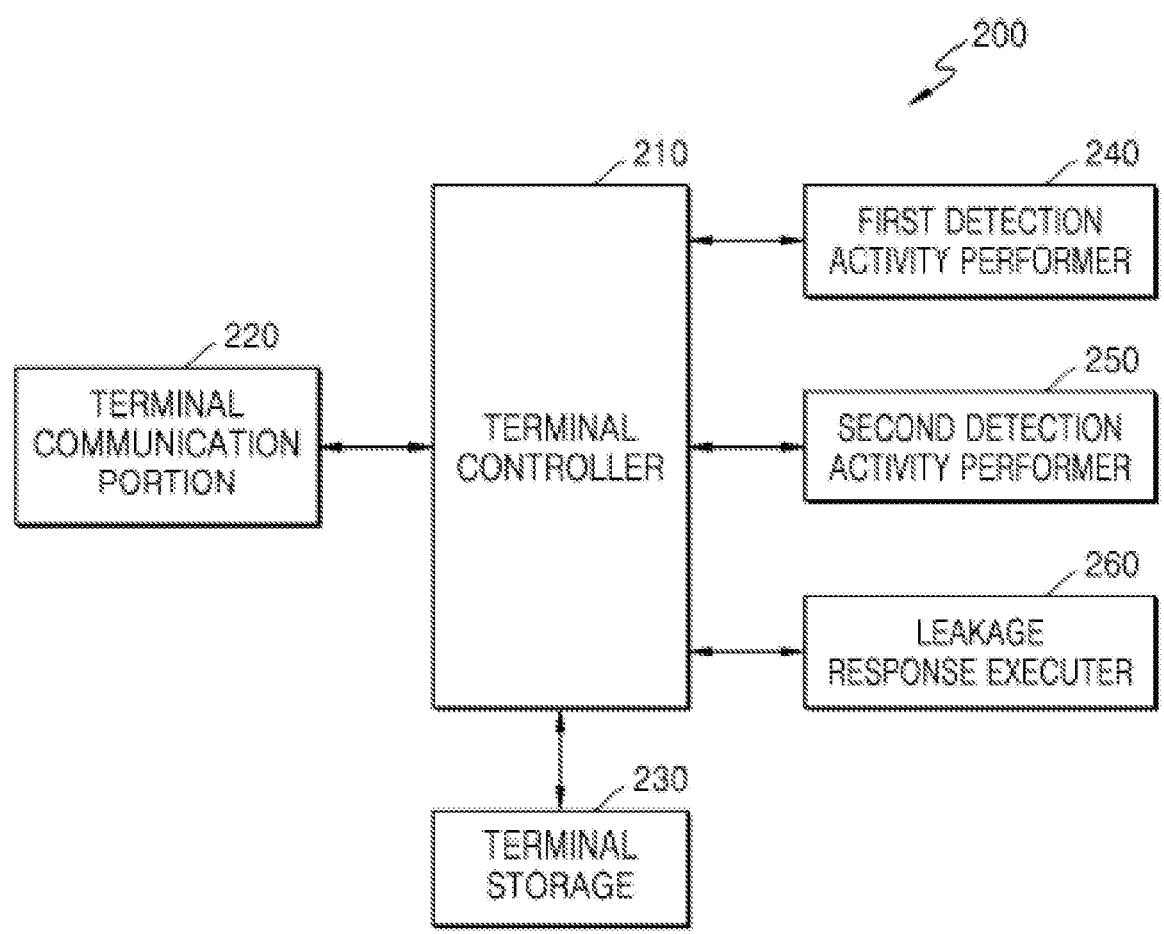
FIG. 3 is a block diagram illustrating an endpoint terminal according to one embodiment of the present invention.

FIG. 3 is a block diagram illustrating an example of the endpoint terminal 200 according to one embodiment of the present invention.

Referring to FIG. 3, the endpoint terminal 200 includes a terminal controller 210, a terminal communication portion 220, a terminal storage 230, a first detection activity performer 240, a second detection activity performer 250, and a leakage response executer 260.

The terminal controller 210 controls operations of the terminal communication portion 220, the terminal storage 230, the first detection activity performer 240, the second detection activity performer 250, and the leakage response executer 260. To this end, the terminal controller 210 may include a central processing unit (CPU), an application processor (AP), a communication processor (CP), or the like. Accordingly, the terminal controller 210 may execute calculation or data processing related to control and/or communication of at least one component of the endpoint terminal 200.

The terminal communication portion 220 receives the detection pattern information provided by the management server 100. The terminal communication portion 220 receives the detection pattern information transmitted from the management server 100 through the wired communication network or wired communication network. In order to receive the detection pattern information through the wired communication network or wireless communication network, the terminal communication portion 220 may include a wired communication module supporting wired communication protocols or a wireless communication module supporting wireless communication protocols.

The terminal storage 230 stores program information for a system operation of the endpoint terminal 200. Also, the terminal storage 230 stores program information for detecting an information leakage generated at an endpoint. For example, the terminal storage 230 stores the detection pattern information received through the terminal communication portion 220. Otherwise, the terminal storage 230 stores first detection activity information or second detection activity information according to a detection activity performed by the first detection activity performer 240 or the second detection activity performer 250.

The first detection activity performer 240 searches for whether data to be detected is stored by monitoring generation and change of a file by using the detection pattern information and performs a first detection activity through matching of keyword pattern stored in a heap memory of a currently-executed process.

The first detection activity performer 240 may perform the first detection activity through matching the detection pattern information with at least one of user identification (ID) information, a user Internet protocol (IP), use time, and used-process information stored in the heap memory in a memory area of each of processes being executed at the endpoint. The first detection activity performer 240 periodically performs the first detection activity.

Figure 4:
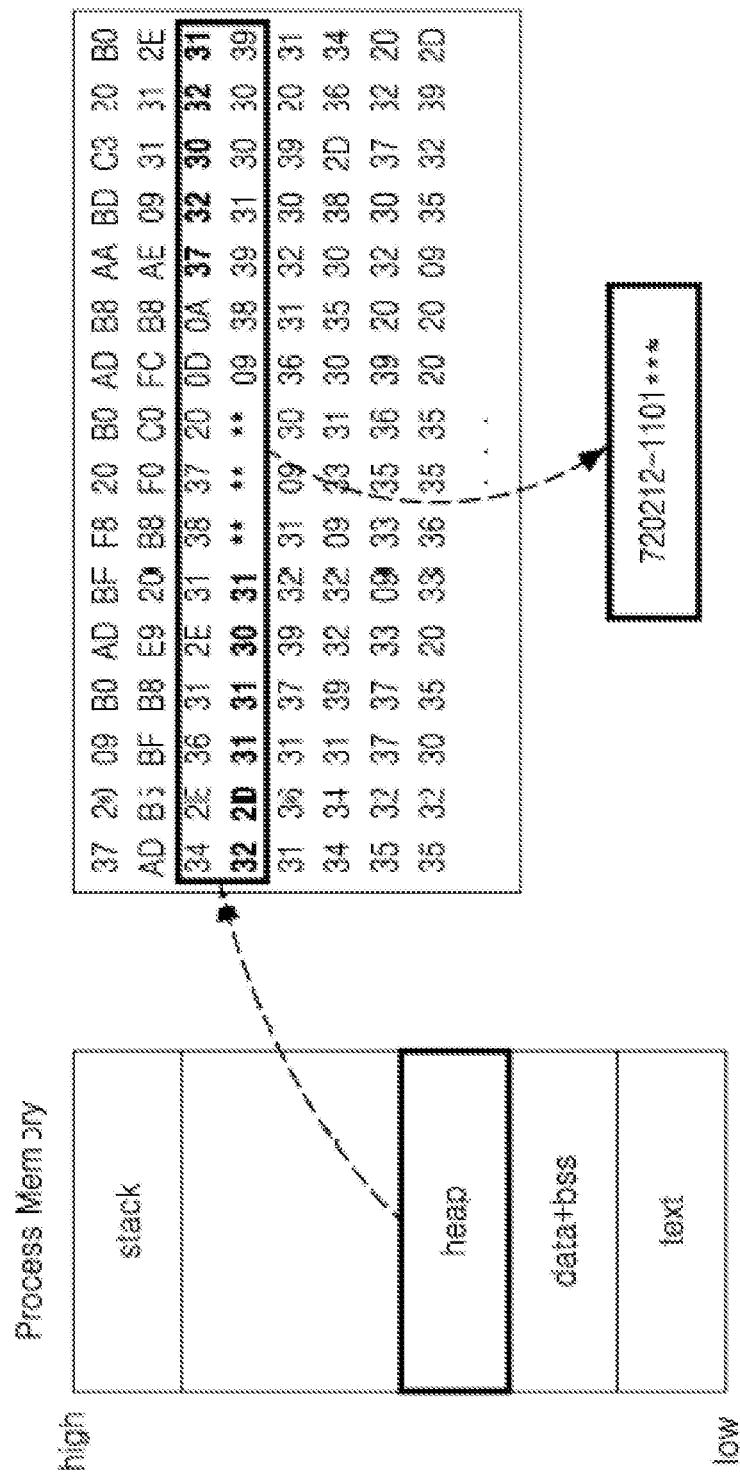
FIG. 4 is a reference view illustrating a first detection activity performed by a first detection activity performer according to one embodiment of the present invention.

FIG. 4 is a reference view illustrating the first detection activity performed by the first detection activity performer 240 according to one embodiment of the present invention.

Referring to FIG. 4, the first detection activity performer 240 detects particular personal information or keyword information in a heap memory area among a memory of a particular process. The first detection activity performer 240 may detect data matched with personal information or keyword information processed by currently-executed processes by checking particular pieces of personal information or keyword information in the heap memory area. Through this, information may be detected from plain text data in a state before the corresponding process encodes data.

The first detection activity performer 240 extracts first detection activity information including a user IP, user ID information, use time, process information (a name of process and a process ID), and the like when a leakage of personal information is detected. The extracted first detection activity information is used as information for tracking leakage information when a following leakage accident occurs.

The second detection activity performer 250 performs a second detection activity according to monitoring a particular API according to process execution. Here, the second detection activity performer 250 may monitor execution of the particular API and may perform a second detection activity through matching the detection pattern information with API execution argument information when the particular API is executed.

The second detection activity performer 250 monitors operations of processes executed at the endpoint, and accurately, execution of a previously designated API and detects an information leakage through matching detection pattern information with keyword pattern by using an API execution argument.

Figure 5:
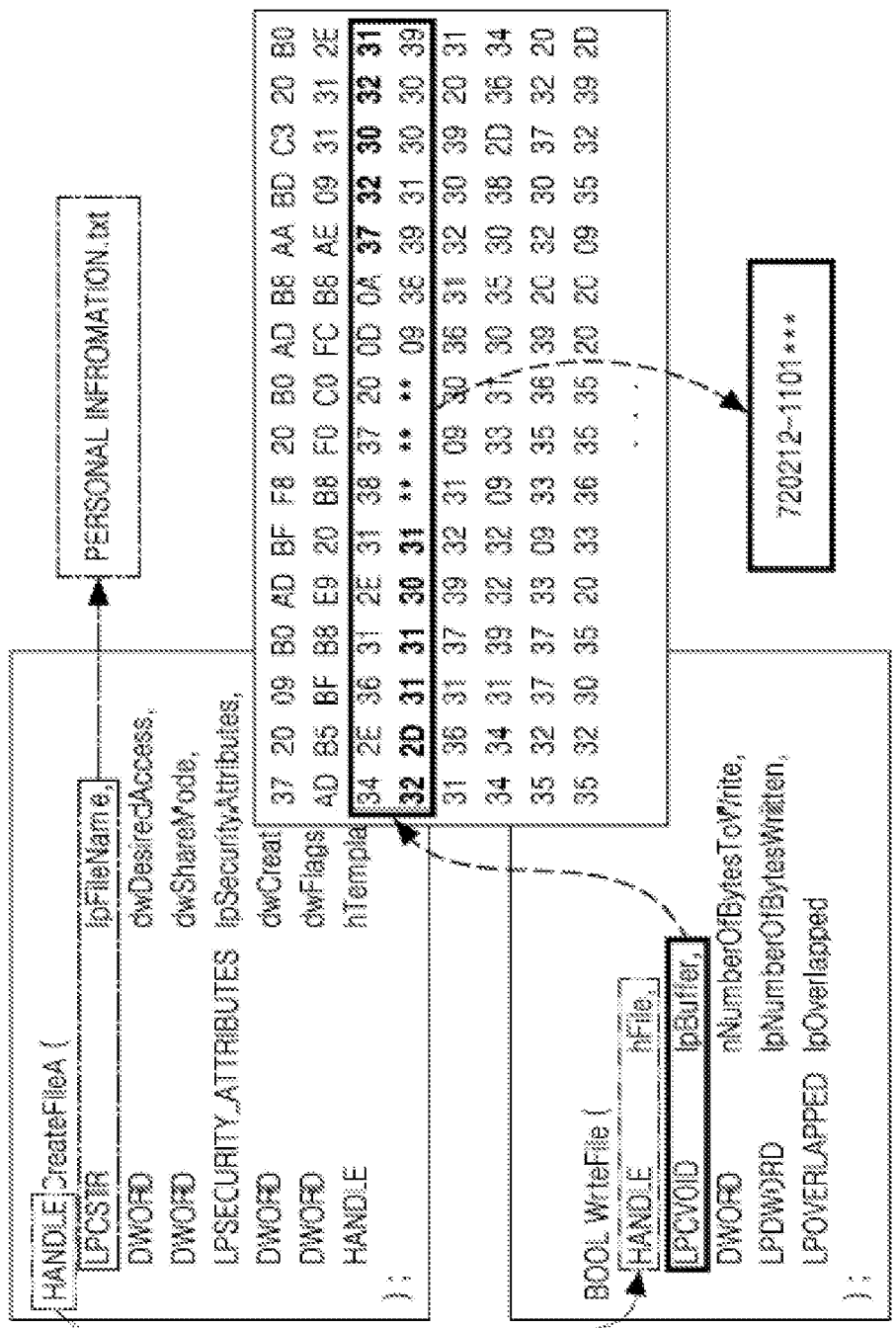
FIG. 5 is a reference view illustrating a second detection activity performed by a second detection activity performer according to one embodiment of the present invention.

FIG. 5 is a reference view illustrating the second detection activity performed by the second detection activity performer 250 according to one embodiment of the present invention.

Referring to FIG. 5, a process is illustrated in which a particular process currently executed at the endpoint generates a file called "personal information.txt" by executing CreateFile API and stores personal information in a corresponding file by executing WriteFile API.

When CreateFile API is called while the process is monitored at the endpoint, the second detection activity performer 250 detects a name of a corresponding file through lpFileName argument. The second detection activity performer 250 may detect handle of the corresponding file through return information of CreateFile API. Here, the handle of the file is transferred afterward as an argument for identifying target file information when WriteFile API is executed. When WriteFile API is called, the second detection activity performer 250 may identify a particular file by matching with the handle returned by CreateFile API in advance through hFile argument. The second detection activity performer 250 identifies a memory address of data to be stored in a file through lpBuffer among arguments of WriteFile API. The second detection activity performer 250 detects an information leakage by detecting personal information and a keyword pattern from the memory address indicated by lpBuffer.

The second detection activity performer 250 may extract second detection activity information such as user IP, user ID information, process information (a name of process and process image hash), file information (a name and a size of a file), leakage means, a destination, and the like according to the second detection activity.

The second detection activity performer 250 may detect data matched with personal information processed by processes currently-executed at the endpoint and a keyword pattern like the first detection activity performer 240. Particularly, the second detection activity performer 250 may obtain a purpose or a method of processing data as additional information according to a type of API being monitored. For example, the second detection activity performer 250 may detect a case of copying information to a file to leak information and encoding content of information to avoid information leakage detection. Also, the second detection activity performer 250 may obtain destination information when the information is transmitted through a network.

Figure 6:
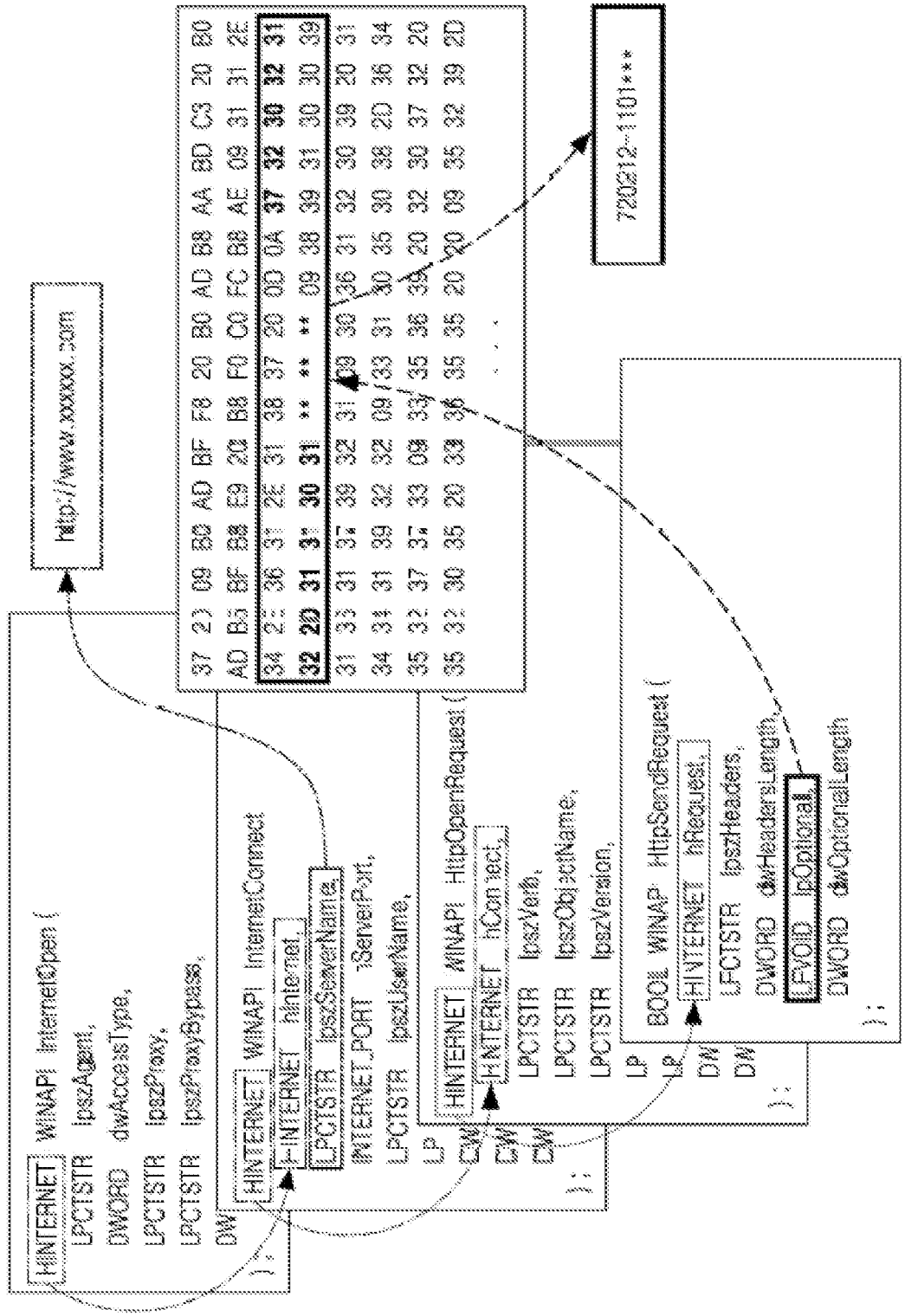
FIG. 6 is a schematic diagram of an application program interface (API) used for accessing a particular server and transmitting personal information through a network.

FIG. 6 is a schematic diagram of an API used for accessing a particular server and transmitting personal information through a network.

Internet access is initialized using InternetOpen API, and returned handle information is transmitted afterward to a parameter of InternetConnect API. An address of a site to be accessed may be known from lpszServerName argument information transmitted to InternetConnect API, and the returned handle is transmitted afterward to HttpOpenRequest API. The handle returned from the HttpOpenRequest API is transmitted to HttpSendRequest API. Here, the second detection activity performer 250 identifies a memory address in which data to be transmitted to a site corresponding to the data is stored through lpOptional argument information transmitted therewith. The second detection activity performer 250 detects an information leakage by detecting personal information and a keyword pattern from an address indicated by lpOptional.

Both the first detection activity and the second detection activity may detect an information leakage through matching personal information of data processed by a process with keyword pattern. In the case of the second detection activity, more precise and detailed information than those of the first detection activity may be obtained. However, when an action occurs using an API not be monitored or in another detour method, since the second detection activity cannot detect the action, the action is detected using a hybrid method to increase a detection rate and minimize a blinded area of information leakage detection. An API usable for detecting an information leakage using such API calling argument is as follows.

TABLE 1

| Classification | API |
| --- | --- |
| Transmission through network | connect |
|  | send |
| Encoding of data | CryptCreateHash |
|  | CryptHashData |
|  | CryptDeriveKey |
|  | CryptEncrypt |
| Tracking of process | CreateProcess |
|  | WinExec |
|  | ShellExecute |

The leakage response executer 260 executes a process corresponding to an information leakage according to first detection activity information obtained by the first detection activity and second detection activity information obtained by the second detection activity.

For example, the leakage response executer 260 may perform a response such as a blocking, deleting, isolating, and encoding with respect to a leakage action as an information leakage response process according to a policy defined in advance. Here, blocking refers to fundamentally prevent a leakage action, deleting refers to deleting target data where a leakage action occurs, isolating refers to moving target data not to allow unauthorized access, and encoding refers to encoding target data.

Meanwhile, the terminal controller 210 controls the first detection activity performer 240 and the second detection activity performer 250 to transmit the detected first detection activity information and second detection activity information to the management server 100. Accordingly, the terminal communication portion 220 transmits the first detection activity information and the second detection activity information according to the information leakage to the management server 100 through the wired or wireless communication network.

The management server 100 receives the first detection activity information and the second detection activity information transmitted from the endpoint terminal 200 through the server communication portion 140. The received first detection activity information and second detection activity information are stored in the database 130.

The server controller 110 classifies file information of leakage information, process information with respect to the leakage information, and action information handled by a process for processing the leakage information from the received first detection activity information and second detection activity information and controls each of the file information, the process information, and the action information to be stored in the database 130. Accordingly, the database 130 classifies and stores each of the file information, the process information, and the action information corresponding to the leakage information.

Figure 7:
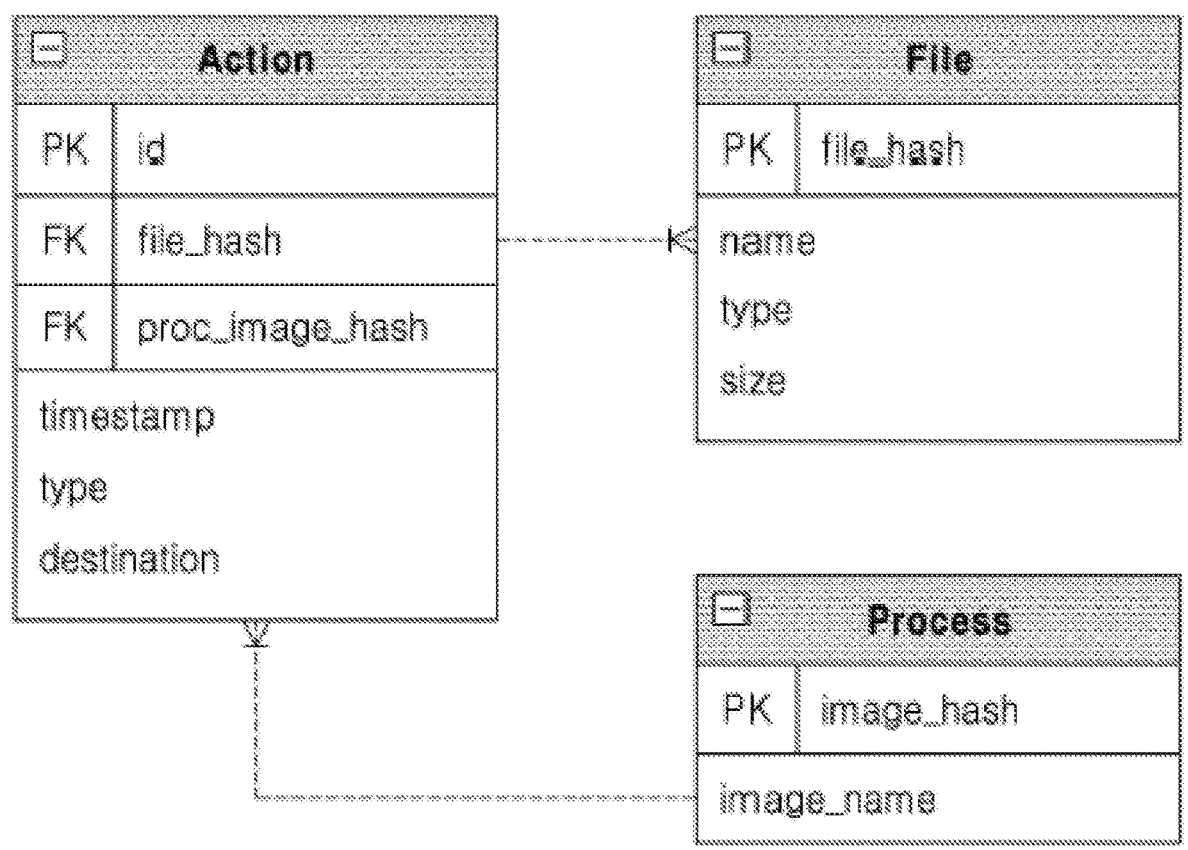
FIG. 7 is a reference view illustrating an object relational diagram of leakage information stored in a database according to one embodiment of the present invention.

FIG. 7 is a reference view illustrating an object relational diagram of leakage information stored in the database 130 according to one embodiment of the present invention.

Referring to FIG. 7, the database 130 may store information on a file table storing file information to be leaked, information on a process table storing process information for handling the corresponding file, and information on an action table storing information on handling the file by the corresponding file.

As shown in FIG. 7, the information on the file table includes information on a file name, a file type, a file size, and the like. Also, the information on the process table includes process hash information and information on a process name and the like. Also, the information on the action table includes type information of an operation of handling a file by a particular process with respect to storage, encoding, compression, transmission through a network, and the like and destination information which means a destination or a target of performing an operation with respect to the corresponding file.

Meanwhile, the management server 100 may receive a search request signal with respect to leakage information from a user terminal. The search request signal is a signal which requests information all pieces of information related to leakage information requested by a user. The leakage information extractor 150 of the management server 100 extracts leakage information corresponding to the search request signal. The user terminal may include a desktop personal computer (PC), a laptop PC, a netbook computer, a workstation, a server, a smart phone, a tablet PC, and the like.

The leakage information extractor 150 extracts the leakage information corresponding to the search request signal by using the file table information, the process table information, and the action table information of the leakage information stored in the database 130 Here, the leakage information extractor 150 may extract file information of a target to be leaked, process information of the target to be leaked, destination information of the target to be leaked, and the like as leakage information.

When the leakage information is extracted, the server communication portion 140 transmits the leakage information to the user terminal under the control of the server controller 110. Accordingly, the user terminal may display the leakage information provided by the management server 100 on a display screen.

Figure 8:
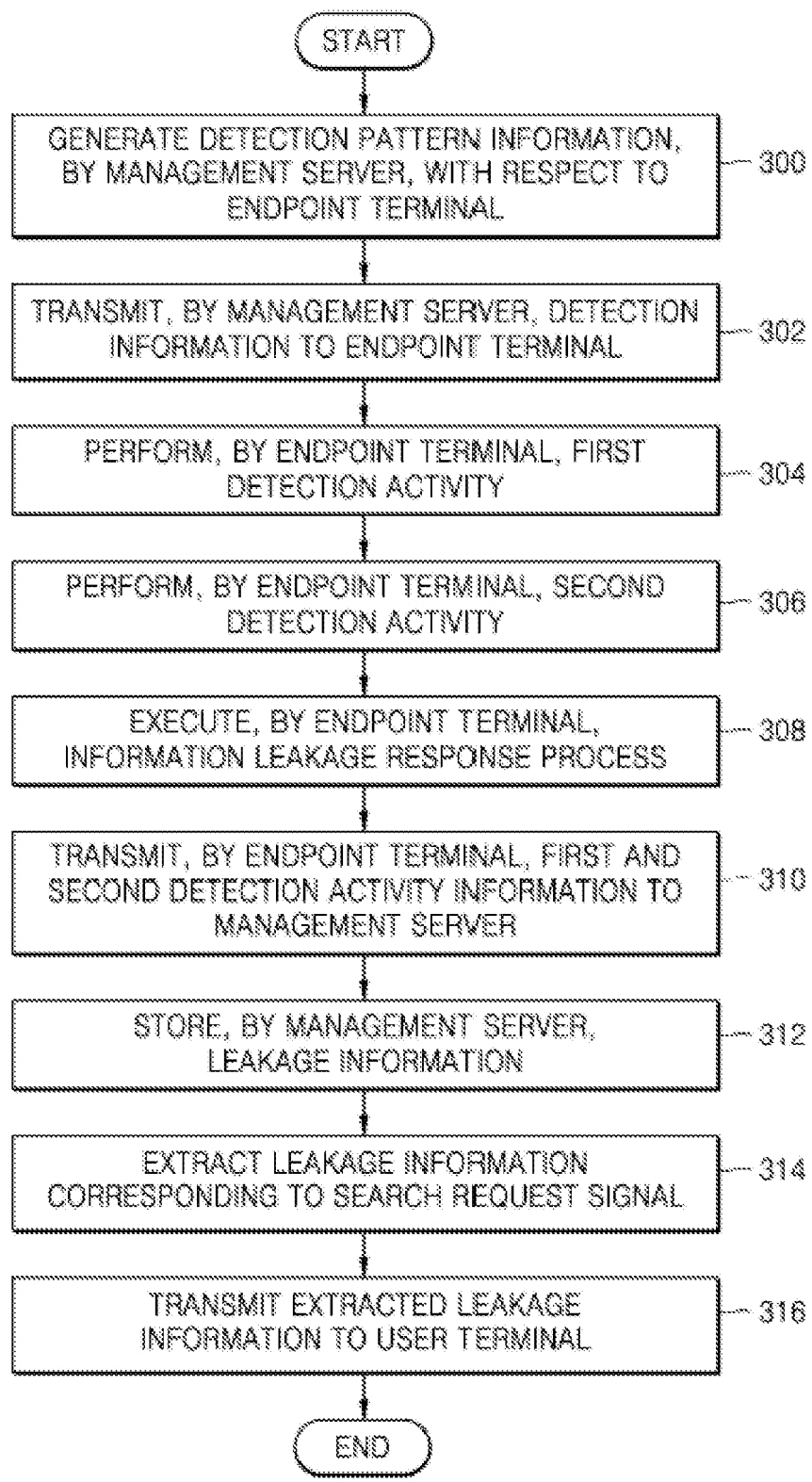
FIG. 8 is a flowchart illustrating a method for tracking an information leakage at an endpoint according to one embodiment of the present invention.

FIG. 8 is a flowchart illustrating a method for tracking an information leakage at an endpoint according to one embodiment of the present invention.

Detection pattern information for detecting a leakage of user personal information and keyword information of an endpoint terminal managed by a management server is generated (operation 300). The detection pattern information includes at least one of a resident registration number, a passport number, a driver's license number, a credit card number, and an account number of a user.

After operation 300, the management server transmits the detection pattern information to the endpoint terminal connected through a network (operation 302).

After operation 302, the endpoint terminal stores the detection information provided by the management server, monitors generation and change of a file by using the detection pattern information, searches for whether data to be detected is stored, and performs a first detection activity through matching information stored in a heap memory of a currently-executed process with the detection pattern information (operation 304). In the operation of performing the first detection activity, the first detection activity is performed through matching the detection pattern information with at least one of user ID information, a user IP, use time, and user process information stored in the heap memory.

After operation 304, the endpoint terminal performs a second detection activity according to monitoring of a particular API according to execution of a process by the endpoint terminal (operation 306). In the operation of performing the second detection activity, the second detection activity is performed by monitoring execution of the particular API and matching the detection pattern information with API execution argument information when the particular API is executed.

After operation 306, the endpoint terminal executes an information leakage response process in response to first detection activity information obtained by performing the first detection activity and second detection activity information obtained by performing the second detection activity (operation 308). For example, the endpoint terminal may perform a response such as a blocking, deleting, isolating, and encoding with respect to a leakage action as an information leakage response process according to a policy defined in advance.

After operation 308, the endpoint terminal transmits the first detection activity information and the second detection activity information to the management server (operation 310).

After operation 310, the management server stores the leakage information corresponding to the first detection activity information and the second detection activity information transmitted from the endpoint terminal (operation 312).

The management server classifies file information of the leakage information, process information with respect to the leakage information, and action information handled by a process for processing the leakage information from the received first detection activity information and second detection activity information and stores each of the file information, the process information, and the action information. The file information includes information on a file name, a file type, a file size, and the like. Also, the process information includes process hash information and information on a process name and the like. Also, the action information includes type information of an operation of handling a file by a particular process with respect to storage, encoding, compression, transmission through a network, and the like and destination information which means a destination or a target of performing an operation with respect to the corresponding file.

After operation 312, the management server receives a search request signal with respect to leakage information from a user terminal and extracts leakage information corresponding to the search request signal (operation 314). In the operation of extracting the leakage information, the leakage information corresponding to the search request signal is extracted by using file information of the leakage information, process information with respect to the leakage information, and action information handled by a process of processing the leakage information.

After operation 314, the management server transmits the extracted leakage information to the user terminal (operation 316). Accordingly, the user terminal displays the leakage information provided by the management server on a display screen.

According to the embodiments of the present invention, an action of leaking information such as personal information and the like at an endpoint may be detected, the corresponding leakage may be prevented, and tracking information on how the information is leaked, where the information is leaked to, and in which process of the endpoint the information is leaked so as to prevent identity theft.

Also, according to the embodiments of the present invention, a function of detecting a leakage using an encoded file which is not provided by existing information protecting systems may be provided.

The exemplary embodiments of the present invention have been described above. One of ordinary skill in the art may understand that modifications may be made without departing from the scope of the present invention. Therefore, the disclosed embodiments should be considered in a descriptive point of view not in a limitative one. Accordingly, the scope of the present invention is not limited to the above-described embodiments and should be interpreted as including the content stated in the claims and a variety of embodiments within the equivalent scope thereof.

DESCRIPTION OF REFERENCE NUMERALS

100: management server
110: server controller
120: detection pattern generator
130: database
140: server communication portion
150: leakage information extractor
200: endpoint terminal
210: terminal controller
220: terminal communication portion
230: terminal storage
240: first detection activity performer
250: second detection activity performer
260: leakage response executer

What is claimed is:

1. A system for tracking an information leakage of an endpoint, comprising:
a management server comprising a detection pattern generator which generates detection pattern information for detecting a leakage of user personal information and keyword information with respect to a target to be managed, a database which stores the detection pattern information, a server communication portion which transmits the detection pattern information to the endpoint terminal connected through a network, and a server controller which controls them; and
an endpoint terminal comprising a storage which stores the detection pattern information provided from the management server, a first detection activity performer which monitors generation and change of a file by using the detection pattern information, searches for whether data to be detected is stored, and performs a first detection activity through matching information stored in a heap memory of a currently-executed process with the detection pattern information, a second detection activity performer which performs a second detection activity according to monitoring of a particular application program interface (API) according to process execution, a leakage response executer which executes an information leakage response process corresponding to first detection activity information obtained by performing the first detection activity and second detection activity information according to the second detection activity, a terminal communication portion which transmits the first detection activity information and the second detection activity information to the management server, and a terminal controller which controls them,
wherein the database of the management server stores leakage information corresponding to the first detection activity information and the second detection activity information transmitted from the endpoint terminal.

2. The system of claim 1, wherein the detection pattern information comprises at least one of a resident registration number, a passport number, a driver's license number, a credit card number, and an account number of a user.

3. The system of claim 1, wherein the first detection activity performer performs the first detection activity through matching the detection pattern information with at least one of user identification (ID) information, a user Internet protocol (IP), use time, and used-process information stored in the heap memory.

4. The system of claim 1, wherein the second detection activity performer monitors execution of the particular API and performs the second detection activity through matching the detection pattern information with API execution argument information when the particular API is executed.

5. The system of claim 1, wherein the management server further comprises a leakage information extractor which receives a search request signal with respect to leakage information from a user terminal and extracts leakage information corresponding to the search request signal, and
wherein the server communication portion transmits the extracted leakage information to the user terminal.

6. The system of claim 5, wherein the leakage information extractor extracts the leakage information corresponding to the search request signal by using file information of the leakage information, process information with respect to the leakage information, and action information handled by a process of processing the leakage information stored in the database.

7. The system of claim 6, wherein the action information comprises:
process operation type information comprising storage, encoding, compression, and transmission through a network; and
destination information according to operation performance.

8. A method of tracking an information leakage of an endpoint, comprising:
generating detection pattern information, by a management server, for detecting a leakage of user personal information and keyword information of a managed endpoint terminal;
transmitting the detection pattern information, by the management server, to the endpoint terminal connected through a network;
performing a first detection activity, by the endpoint terminal, by storing the detection pattern information provided by the management server, monitoring generation and change of a file by using the detection pattern information, searching for whether data to be detected is detected, and matching information stored in a heap memory of a currently-executed process with the detection pattern information;

performing a second detection activity, by the endpoint terminal, according to monitoring of a particular API according to process execution;

executing an information leakage response process, by the endpoint terminal, corresponding to first detection activity information according to the first detection activity and second detection activity information according to the second detection activity;

transmitting, by the endpoint terminal, the first detection activity information and the second detection activity information to the management server; and storing, by the management server, leakage information corresponding to the first detection activity information and the second detection activity information transmitted from the endpoint terminal.

9. The method of claim 8, wherein the detection pattern information comprises at least one of a resident registration number, a passport number, a driver's license number, a credit card number, and an account number of a user.

10. The method of claim 8, wherein the performing of the first detection activity comprises performing the first detection activity through matching the detection pattern information with at least one of user ID information, a user IP, use time, and used-process information stored in the heap memory.

11. The method of claim 8, wherein the performing of the second detection activity comprises monitoring execution of the particular API and performing the second detection activity through matching the detection pattern information with API execution argument information when the particular API is executed.

12. The method of claim 8, further comprising:

receiving a search request signal with respect to leakage information from a user terminal and extracting leakage information corresponding to the search request signal; and transmitting the extracted leakage information to the user terminal.

13. The method of claim 12, wherein the extracting of the leakage information comprises extracting the leakage information corresponding to the search request signal by using file information of the leakage information, process information with respect to the leakage information, and action information handled by a process of processing the leakage information stored in the management server.

14. The method of claim 13, wherein the action information comprises:

process operation type information comprising storage, encoding, compression, and transmission through a network; and destination information according to operation performance.

* * * * *